United States Patent

[11] 3,556,416

| [72] | Inventor | Joseph Iannicelli<br>Macon, Ga. |
|---|---|---|
| [21] | Appl. No. | 740,955 |
| [22] | Filed | June 28, 1968 |
| [45] | Patented | Jan. 19, 1971 |
| [73] | Assignee | J. M. Huber Corporation<br>Locust, N.J.<br>a corporation of New Jersey |

[54] APPARATUS FOR SHEARING SOLIDS IN A SOLIDS-LIQUID SUSPENSION
1 Claim, 10 Drawing Figs.

[52] U.S. Cl. .................................................. 241/39, 241/95
[51] Int. Cl. .................................................. B02c 19/00
[50] Field of Search.......................................... 241/38.40, 46.02, 46.04, 69, 95, 274, 276; 210/266, 282; 55/518

[56] References Cited
UNITED STATES PATENTS

| 2,243,949 | 6/1941 | Fox | 210/266 |
|---|---|---|---|
| 3,182,803 | 5/1965 | Chisholm | 210/282X |
| 3,202,364 | 8/1965 | Wieland | 241/30 |
| 3,319,791 | 5/1967 | Horne | 210/266X |
| 3,342,340 | 9/1967 | Shindell | 210/282 |

Primary Examiner—Donald G. Kelly
Attorney—Harold H. Flanders

ABSTRACT: An apparatus for use in conjunction with a pump capable of pumping a solid-liquid suspension at pressures in excess of 1000 p.s.i. which apparatus comprises a column containing particulate media adjustably clamped in fixed position through which the slurry is pumped. The media is made up of hard, durable, substantially nondeformable, nonflowable discrete particles forming a plurality of torturous passages producing high shear on solids in the suspension pumped therethrough.

FIG. I

INVENTOR
JOSEPH IANNICELLI

BY

ATTORNEY 3,556,416

APPARATUS FOR SHEARING SOLIDS IN A SOLIDS-LIQUID SUSPENSION

BACKGROUND OF THE INVENTION

In general, the present invention relates to solid-liquid suspensions and more specially to an apparatus for shearing solids in such suspensions.

In particular, the invention relates to apparatus for reducing the size of particles suspended in a slurry by forcing the slurry through a column packed with relatively coarse coarse, hard, substantially nondeformable, nonflowable discrete aggregates including both abrasive as well as nonabrasive material in a wide variety of geometric shapes.

The high pressure pumping of slurries to shear the slurries and effect changes in the characteristics of the solids is, of course, well known. Such pumping has been used for processes such as homogenization, dispersion of solids in fluids, reduction in viscosity and reduction in particle size. In such uses, a resiliently biased orifice valve is used to retard the flow of slurry from the pump to build pressure in the pump and force the slurry at extremely high velocities through an orifice in a relatively thin film. In each of these uses the very high velocity of the slurry is such that the valve is quite quickly eroded away and must be replaced after a very short useful life.

Pumping as described above is, however, extremely efficient and even with the high maintenance cost in valve replacement is one of the most efficient shear apparatus now available.

Accordingly, it is an object of the present invention to provide a new, highly effective device which overcomes the deficiencies of the prior art as described above while retaining at least a like efficiency of operation.

It is a further object of the present invention to provide a device which will reduce the cost of the shearing operation in a solid-liquid suspension.

Another object of the present invention is to provide a device for achieving shearing in solid-liquid suspensions having increased reliability.

Other objects and a fuller understanding of the present invention may be had by referring to the following description and claims taken in conjunction with the accompanying drawings.

SUMMARY OF THE INVENTION

The present invention overcomes the deficiencies of the prior art and achieves its objectives by providing a packed column of hard substantially nondeformable, relatively coarse particle size aggregates which provide a plurality of tortuous passages through which a suspension of solids in a liquid is pumped at an inlet pressure in excess of 1,000 p.s.i. In passing through the tot tortuous passages a very rapid acceleration to very high velocities takes place. At the same time the suspension is exposed to an extreme turbulent condition combined with shear, cavitation and impact as it impinges on the surrounding aggregates. Use of the apparatus produces a dispersion of reduced particle size which in some materials such as kaolin clay may result from disaggregation and delamination.

BRIEF DESCRIPTION OF THE DRAWINGS

In order to facilitate the understanding of the present invention, reference will now be made to the appended drawings of preferred embodiments of the present invention. The drawings should not be construed as limiting the invention, but are exemplary only. In the drawings.

Referring now to the drawings in detail wherein like reference characters indicate like parts throughout the several figures.

DESCRIPTION OF THE PREFERRED EMBODIMENTS

Figure 1:
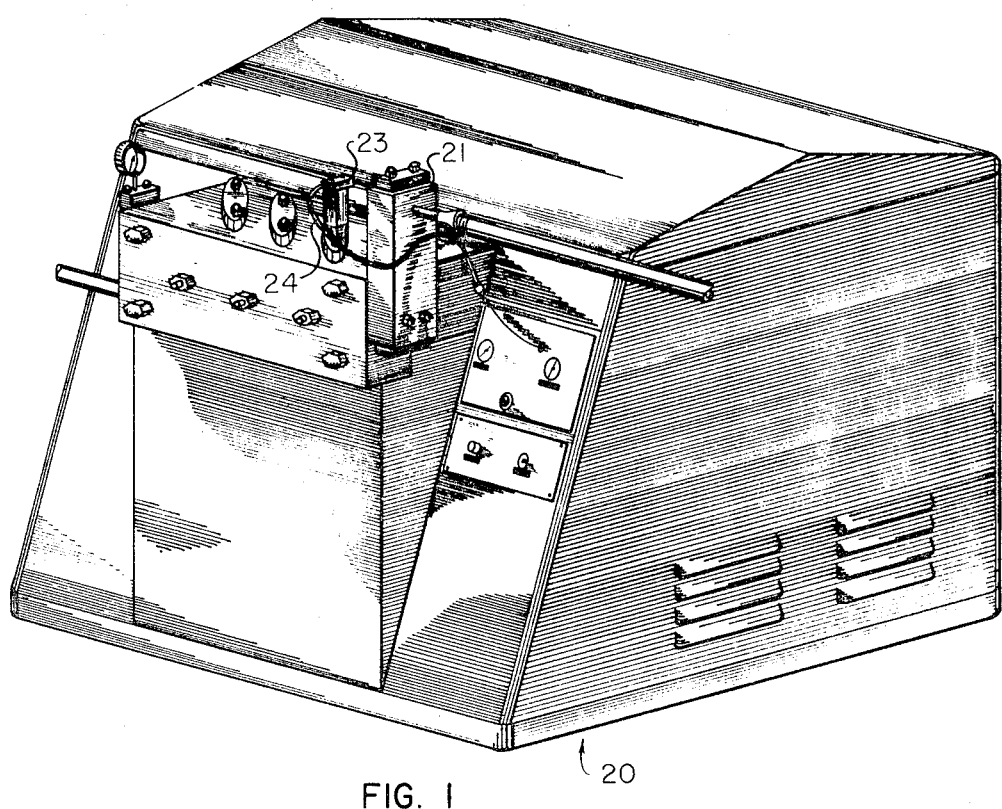
FIG. 1 is a perspective view of a high pressure pump incorporating the invention.

A preferred embodiment of the present invention is shown generally in FIG. 1 in which the reference numeral 20 indicates generally a high pressure pump which may be used in accordance with the present invention.

The high pressure pump 20 may be of an any type developing in excess of about 1,000 p.s.i. with the pump illustrated being a Sub Micron Disperser Model 2050-MC45-5TBS as manufactured by Manton-Gaulin Manufacturing Company, Inc., Everett, Massachusetts. The pump, shown here for purposes of illustration, is of a conventional piston cylinder type and has a column block 21 secured to the outlet 22 thereof. A bypass valve 23 communicates with the outlet 22 thereof. A pump 20 and is controlled through a hydraulic line 24 to vary the pressure at which the bypass valve 23 is of conventional construction. The bypass or relief valve may be a hydraulically loaded homogenization type valve or a spring loaded release valve or similar device. Obviously, any suitable pump capable of achieve achieving the desired pressures may be employed in accordance with the teachings of the present invention as a matter of choice. In particular, a piston cylinder type pump need not be employed. Other type pumps such as those of the gas pressure or of the centrifugal type may be employed so long as they produce adequate pressure for the desired application.

The column block 21 is of generally rectangular cross section and is provided with a control bore 25 extending completely through the top end 26 and the bottom end 27 of the column block 21. An inlet bore 28 extends horizontally from the central bore 25 through the side we wall of the column block 21 near the bottom end 27 thereof. A recessed seal 29 is arranged at the outer end of the inlet bore 28 and seals the column block 21 to the pump 20.

A threaded outlet bore 30 extends horizontally from the central bore 25 through the side wall of the column block 21 near the top end 26 thereof. The outlet bore 30 extends through the opposite side of the column block 21 from the inlet bore 28.

A lower clamp member 31 has a generally cylindrical body 32 having an annular O-ring groove 33 formed therein. A reduced diameter extension 34 is integrally formed on the body 32 and extends coaxially therewith. The clamp member 31 is fitted with an O-ring seal 35 seated in the O-ring groove 33. The O-ring seal 35 engages the surface of the bore 25 below the inlet bore 28 to prevent escape of pressure through the lower end of the bore 25.

Figure 2:
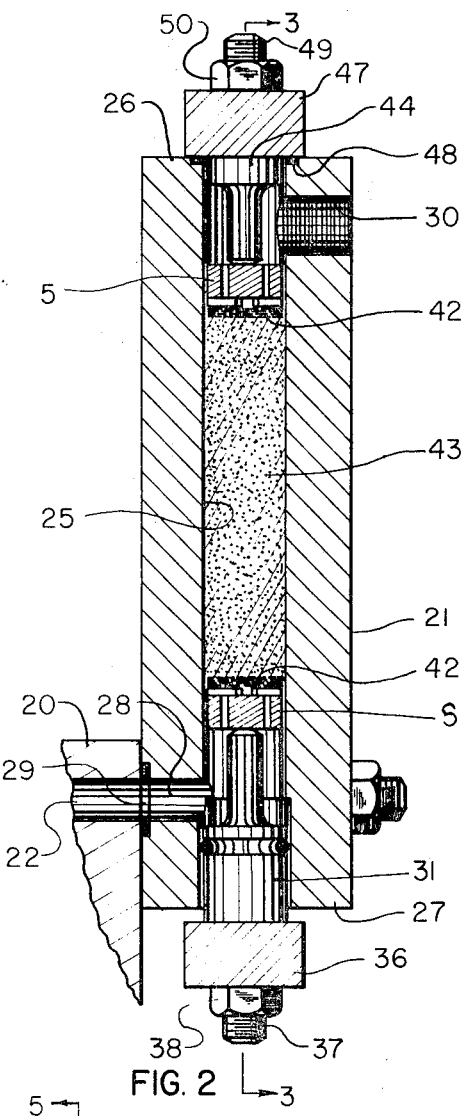
FIG. 2 is a vertical cross section taken through the column.
Figure 3:
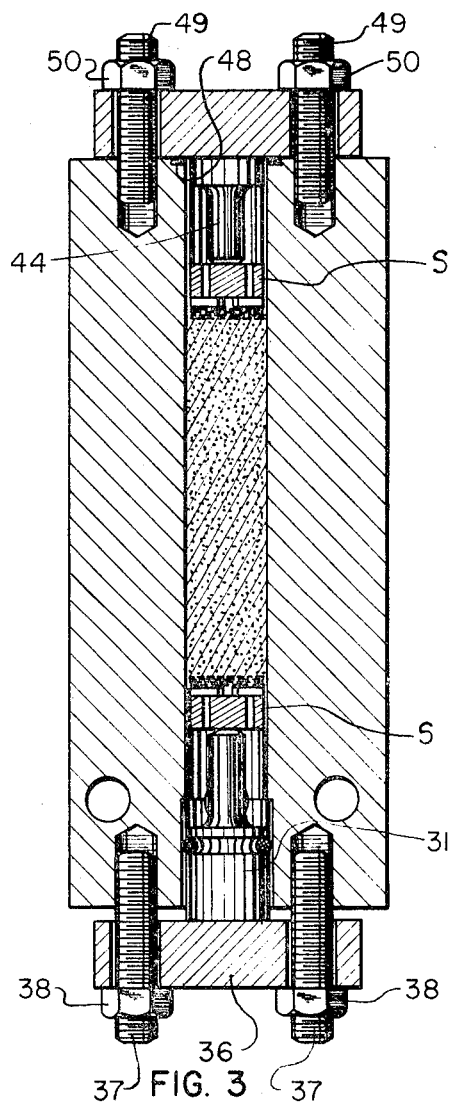
FIG. 3 is vertical cross section taken along the line 3—3 of FIG. 2 looking in the direction of the arrows.
Figure 4:
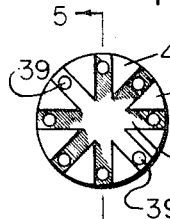
FIG. 4 is a plan view of a screen support.
Figure 5:
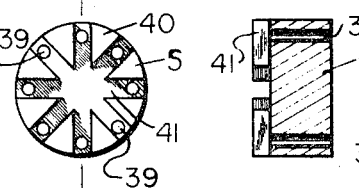
FIG. 5 is a vertical cross section taken along the line 5—5 of FIG. 4 looking in the direction of the arrows.
Figure 6:
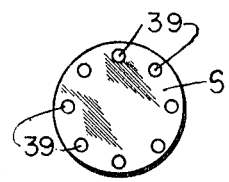
FIG. 6 is a plan view of the face of the screen support opposite the face illustrated in FIG. 4.
Figure 7:
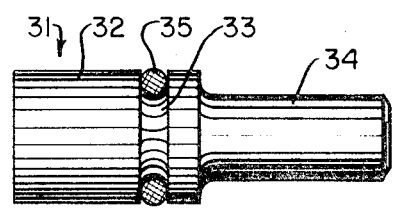
FIG. 7 is a plan view of the lower clamp member shown partially in section for convenience of illustration.
Figure 8:
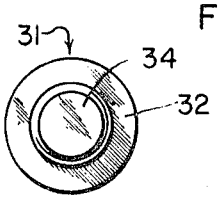
FIG. 8 is an end view of the structure illustrated in FIG. 7.
Figure 9:
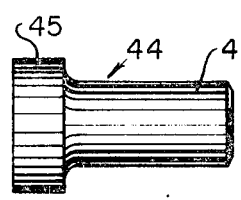
FIG. 9 is a side elevation of the upper clamp member and FIG. 10 is an end view of the structure illustrated in FIG. 9.
Figure 10:
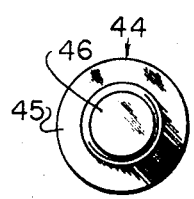

A plate 36 is positioned in engagement with the lower end of the clamp member 31 and is secured to the column block 21 by a pair of threaded studs 37 and nuts 38 as can be seen in FIGS. 2 and 3.

While the above description of the column block has been provided for purposes of illustration it will be obvious to those skilled in the art that many variations of the column block and its cross section may be employed while retaining its essential functions and without departing in substance from the teachings of the present invention.

A generally cylindrical screen support S is mounted in the bore 25 in engagement with the upper end of the extension 34. The screen support S has a plurality of bores 39 extending therethrough with their axes parallel to the axis of the support S. The bores 39 are arranged in a circle adjacent the cylindrical wall of the support S. One end face 40 of the support S is provided with a plurality of radially extending grooves 41 which each intersect one of the bores 39 and also intersect each other at the center of the support S.

A plurality of screens 42 of graduated mesh are mounted on the support S in engagement with the end face 40.

A body of particulate media 43 fills the central portion of the bore 25 supported on the screens 42. A second set of screens 42 and a support S engage the upper end of the body of particulate media 43. An upper clamp member 44 has a cylindrical body 45 and a reduced diameter extension 46 integrally formed thereon and extending axially therewith.

A plate 47 is positioned against the upper end of the column block 21 and engages the upper end of the clamp member 44 and a recessed seal 48. The plate 47 is secured to the column block 21 by a pair of stud bolts 49 and nuts 50. The upper clamp member 44 bears against the upper screen support S to position it within the bore 25. Adjustment of the lower plate 36 by means of the nuts 38 exerts varying clamping pressure on the particulate media 43 and may be tightened as required by the conditions.

The above description of a preferred embodiment of the present invention utilizing support screens should not be understood to limit the present invention to such an arrangement. Specifically, in many applications it will suffice to order the particle size of the particulate media in a decreasing manner toward the center of the column from each end, with the larger particles at each end of the column serving wholly or in part to restrain the central particles of the column. In general, any suitable clamping or restraining means may be utilized in lieu of the screens to function in accord with the present invention. Further, as will become increasingly clear, the present invention is in no way limited by the details of the pump and clamping mechanisms disclosed above, by way of example, but any similar suitable means may be employed to a like end.

In the use and operation of the apparatus of the invention the pump 20 is operated in a normal manner to pump a fluid dispersion of particulate solid through the column 21 of packed particulate media 43 at a predetermined pressure. The individual particles of the dispersed particulate solid are reduced in size by attrition, fracturing and delamination.

The invention is used generally by selecting a particulate media suitable for the purpose and packing the column block 21 with this media. The clamp member 31 is tightened until the media is clamped sufficiently tight to prevent virtually all motion between particles of the media during the practice of the invention.

A particulate solid dispersed in a fluid is then pumped at a pressure in excess of about 1,000 p.s.i. through the particulate media in the column block 21. The operation may be repeated for as many passes through the particulate media as is required to produce the desired properties in the end product.

The following examples teach several of the preferred embodiments of the invention.

EXAMPLE I

A 68.5 solids slurry of coarse filler grade clay having a particle size of 32.1 percent − 2 microns, 36 percent + 5 microns and, 16.49 percent + 10 microns was pumped at 1,000 p.s.i. through a column packed with spherical alumina ceramic beads of 12 to 18 mesh in size.

The resulting clay product had a particle size of 37.6 percent − 2 microns, 32.8 percent + 5 microns and 13.7 percent + 10 microns.

The following tables illustrate additional examples showing the materials used and the results obtained.

TABLE I

| Example | Material treated | Percent solids | Particulate media | Pressure, p.s.i. 1st pass | Pressure, p.s.i. 2nd pass | Pressure, p.s.i. 3rd pass | Percent −2 microns beginning | Percent −2 microns at finish |
|---|---|---|---|---|---|---|---|---|
| II | Kaolin coarse filler grade | 70 | Tumblex 12 XM (A) | 3,300 | | | 31.1 | 39.0 |
| III | do | 70 | Tumblex TL (B) | 2,200 | | | 31.1 | 37.2 |
| IV | do | 70 | Tumblex TL (C) | 1,200 | | | 31.1 | 36.1 |
| V | Product from example IV | 70 | do | | 1,400 | | 36.1 | 37.1 |
| VI | Product from example V | 70 | do | | | 1,550 | 37.1 | 38.1 |
| VII | Kaolin coarse filler grade | 70 | Plexiglass rods (D) | 2,300 | | | 31.1 | 32.7 |
| VIII | Product from example VII | 70 | do | | 1,700 | | 32.7 | 34.3 |
| IX | Product from example VIII | 70 | do | | | 1,400 | 34.3 | 35.9 |
| X | Kaolin coarse filler grade | 30 | 20-25 mesh Ottawa sand (E) | 3,000 | | | 31.1 | 37.1 |
| XI | Talc (G) | 10 | 7-12 mesh Alundum beads (F) | 900 | | | 16.1 | 16.2 |
| XII | do | 10 | do | | 900 | | 16.2 | 16.4 |
| XIII | do | 10 | do | | | 900 | 16.4 | 16.7 |

In Table I above the reference letters are explained as follows:

A. Tumblex 12 MX: A highly abrasive ceramic frit obtained from the Norton Company.
B. Tumblex TL: A high alumina prism approximately one-fourth inch per side and three thirty-seconds inch thick obtained from the Norton Company.
C. Tumblex TL: Ceramic cylinders ⅛" × ⅛" obtained from the Norton Company.
D. Plexiglass Rods: Cylinders ⅛" × ⅛" obtained from Rohm & Haas.
E. 20—25 Mesh Ottawa Sand: Obtained from Ottawa Silica Company, Ottawa, Ohio.
F. 7—12 Mesh Alundum Beads: Alumina spheres obtained from Minnesota Mining and Manufacturing.
G. Talc: Equal parts of Nytal 200 and Nytal 300 talcs obtained from Gouvenuer Talc Company.

Tables I and II illustrate the reduction in particle size of the material treated with wide variations in the pressures, solids content, particulate media and of the material treated.

Table III illustrates the reductions in viscosity which result from the practice of the invention.

In Table III the reference letters are explained as follows:

H. Diamonite ¼": ¼" hidensity radius—end fused alumina cylinders obtained from U.S. Stoneware.
I. HiDensity ¼" Cyl: ¼" fused alumina hidensity flat end cylinders obtained from U.S. Stoneware.
J. Stainless Steel Balls ¼": ¼" spheres of stainless steel obtained from U.S. Stoneware, Akron Ohio.
K. Lucite Balls 3/16": 3/16" spheres of polymethylmethacrylate obtained from Ace Plastic Co., Inc.

The examples demonstrate that the high pressure pumping of solids dispersed in a fluid through a column packed with particulate media will reduce the particle size of the dispersed solid and also reduce the viscosity of the treated material.

In the preferred embodiment any material exhibiting suitable properties of hardness, substantial nondeformability and available in durable, relatively coarse particle sizes may be employed to provide the plurality of tortuous passages through which the solid-liquid suspension is passed. Typical materials of suitable hardness include ceramic frits, alumina, sands, stainless steels, Lucite, Plexiglass, silicon oxides, tungsten carbide, titanium nitride, zirconium carbide, beryllium carbide, titanium carbide, silicon carbide, aluminum boride, boron carbide and the like.

The shape of the particles of the particulate media will generally be spherical, quasispherical, spheroidal, or polyhedral and should not, in general, have many jagged edges since such edges lead to a knitting effect which increases the pressure requirements. This latter consideration is not intended to exclude, however, the use of such materials under certain operating conditions for specific suspensions where the knitting effect is not significant or the increased pressure requirements are not significantly objectionable. Further, nothing above is meant to exclude any shape of particulate material which otherwise meets the needs of the present invention as disclosed herein. For example, certain geometric combinations of tetrahedras, in addition to those naturally oc- As many passes of the material through a given column as are desired or required may be made to achieve the desired particle size and/or viscosity; however, in general, an excessive reduction in particle size by continued repeated passes will result in an undesirable increase in viscosity.

While the invention has been described with reference to its preferred embodiments, it will be understood by those skilled

TABLE II

| Material treated | Solids, percent | P.s.i. | No. passes | Particulate media | Percent −2 microns beginning | Percent −2 microns at finish |
| --- | --- | --- | --- | --- | --- | --- |
| Example: | | | | | | |
| IX.......... Talc.................. | 36.45 | 2,700 | 1 | Tumblex.... | 9.9 | 14.7 |
| | | 2,075 | 4 | 12 XM...... | 14.7 | 15.9 |
| | | 1,900 | 7 | 12 XM...... | 15.9 | 16.2 |
| | | 1,700 | 10 | 12 XM...... | 16.2 | 18.5 |
| X.......... Feldspar............ | 31.2 | 2,650 | 1 | Tumblex.... | 8.5 | 9.8 |
| | | 2,000 | 4 | 12 XM...... | 9.8 | 12.2 |
| | | 1,750 | 7 | 12 XM...... | 12.2 | 12.5 |
| | | 1,625 | 10 | 12 XM...... | 12.5 | 13.9 |
| XI.......... Calcium carbonate.... | 36.3 | 1,650 | 1 | Tumblex.... | 11.4 | 11.9 |
| | | 1,550 | 4 | 12 XM...... | 11.9 | 12.1 |
| | | 1,500 | 7 | 12 XM...... | 12.1 | 12.5 |
| | | 1,450 | 10 | 12 XM...... | 12.5 | 12.9 |
| XII.......... Nepheline syenite...... | 37.2 | 2,700 | 1 | Tumblex.... | 11.2 | 13.4 |
| | | 2,275 | 4 | 12 XM...... | 13.4 | 15.3 |
| | | 2,000 | 7 | 12 XM...... | 15.3 | 18.1 |
| | | 1,900 | 10 | 12 XM...... | 18.1 | 20.0 |

TABLE III

| | | | | | 70% solids consolidated method viscosities | | | | | |
| --- | --- | --- | --- | --- | --- | --- | --- | --- | --- | --- |
| | | | | | As is | | | .025% soda ash added | | |
| Example | Material treated, Hydrasperse (No. 2 coating grade clay) | Percent solids pumped | P.s.i. | No. of passes | Particulate media | Brookfield, cps. 20 r.p.m. No. 1 spindle | Hercules, dyne units/ r.p.m. [1] | Stormer, sec. per 100 revolutions 150 g. wt. [2] | Brookfield, cps. 20 r.p.m. No. 1 spindle | Hercules, dyne units/ r.p.m. [1] | Stormer, sec. per 100 revolutions 150 g. wt. [2] |
| XIII.... | Kaolin clay control........ | | 0 | 0 | ................ | 178 | 18/670 | 13.6 | 192 | 18/660 | 14.2 |
| XIV.... | Hydrasperse kaolin clay. | 69.32 | 3,700 | 1 | Diamonite ¼" (H). | 174 | 18/845 | 12.8 | 191 | 18/815 | 13.3 |
| XV...... | ....do...... | 69.0 | 2,800 | 2 | ....do........ | 168 | 18/910 | 12.3 | 183 | 18/855 | 12.7 |
| XVI..... | ....do...... | 69.47 | 3,000 | 1 | Hi-density ¼" Cyl. (I). | 164 | 18/945 | 12.0 | 186 | 18/840 | 12.6 |
| XVII.... | ....do...... | 69.0 | 2,900 | 2 | ....do........ | 164 | 18/870 | 12.0 | 181 | 18/815 | 13.0 |
| XVIII... | ....do...... | 69.37 | 2,900 | 1 | Stainless steel balls ¼" (J). | 170 | 18.935 | 12.7 | 184 | 18/850 | 13.2 |
| X....... | ....do...... | 69.00 | 2,300 | 2 | ....do........ | 168 | 18/915 | 12.6 | 181 | 18/850 | 13.0 |
| XX...... | Hydrasperse kaolin clay control. | 70.0 | 0 | 0 | ................ | 174 | 18/750 | 13.0 | 194 | 18/705 | 13.6 |
| XXI..... | Hydrasperse kolain clay. | 69.47 | 4,000 | 1 | Lucite balls ³⁄₁₆" (K). | 170 | 18/940 | 12.3 | 188 | 18/910 | 12.8 |

[1] 18 dyne units is maximum torque recorded on viscometer; higher r.p.m. at 18 dyne units represents lower viscosity.
[2] Lower time units per 100 r.p.m. represents lower viscosity.

curring, have been found quite satisfactory as a shape for the individual particles of the media in the operation of the present invention.

The length of the column through which the suspension is to be passed is proportionally related to the initial pressure and the amount of pressure drop across a given length of the column, with a large portion of the work on the solids in suspension believed to be performed in the initial portions of the column.

In addition to the single column shown, several obvious variations to one of ordinary skill in the art may be employed. For example, a single elongated column with decreasing particle size throughout may be used. Alternatively a single high pressure pump may be employed to force the suspension through a plurality of individual columns in a serial arrangement with each column packed with particles of decreasing size. Another alternative is the provision of a plurality of pumps each pump being placed just prior to respective members of a plurality of columns. An additional alternative is the provision of a plurality of columns in a parallel arrangement for funneling the suspension through one or more columns of finer particle size. Any combination of the above arrangements may be employed or modified to meet the needs of the particular materials and exigency of the occasion.

in the art that various changes may be made and equivalents substituted for elements and steps thereof without departing from the true spirit and scope of the invention. In addition, many modifications may be made to adapt a particular situation or material to the teachings of the invention without departing from its essential teachings.

I claim:

1. An apparatus for shearing solids, at least 8.5 percent of which have a particle size less than 2 microns and a predominant portion of which have a particle size less than 10 microns, in a solid-liquid suspension, wherein the percentage of solids is in the range of from about 10 percent to about 80 percent, to produce a reduction in particle size of the solids in said suspension by disaggregation, attrition, fracturing and delamination of the solids comprising:

a. columnar means having a central bore formed therein and communicating at one end of said columnar means with inlet means and at the other end of said columnar means with outlet means;

b. a body of particulate media comprising a plurality of hard, durable, substantially nondeformable, nonflowable discrete particles a substantial portion of which have dimensions on the order of the particle size range of from about 25 mesh to about one-fourth inch restrained within and filling the central bore formed within said columnar means;
c. restraining means at each end of said central bore for preventing the escape of pressure from said central bore and to retain said particulate media in position;
d. adjustable means for varying the restraining pressure on said particulate media so as to prevent substantially all movement by said particles of the media when subjected to a flow of said suspension therethrough; and
e. high pressure pumping means for providing an inlet pressure for said suspension in excess of 1,000 p.s.i., said high pressure pumping means operatively connected through said inlet means to said central bore of said columnar means to force said solid-liquid suspension through the body of said particulate media wherein said discrete particles provide a plurality of tortuous passages producing high shear on said solids as said suspension is pumped through said columnar means.